United States Patent [19]

Rice et al.

[11] Patent Number: 4,763,706

[45] Date of Patent: Aug. 16, 1988

[54] ROUTER MOUNTING TABLE

[75] Inventors: Verle L. Rice, 700 S. Halsey, Harrisonville, Mo. 64701; Steve H. Wall, Mayodan, N.C.

[73] Assignee: Verle L. Rice, Harrisonville, Mo.

[21] Appl. No.: 37,549

[22] Filed: Apr. 13, 1987

[51] Int. Cl.$^4$ ................................................ B27C 5/02
[52] U.S. Cl. .................................. 144/136 R; 144/84; 144/129; 144/134 R
[58] Field of Search .................. 144/1 R, 1 C, 82, 84, 144/85, 87, 88, 134 R, 136 R, 129, 131

[56] References Cited

U.S. PATENT DOCUMENTS

| | | | |
|---|---|---|---|
| 1,346,031 | 7/1920 | Josias | 144/1 C |
| 2,642,902 | 6/1953 | Carey | 144/129 |
| 4,031,932 | 6/1977 | Leasure | 144/129 |
| 4,060,112 | 11/1977 | Leeper, Jr. | 144/134 R |
| 4,405,003 | 9/1983 | Watson et al. | 144/1 C |
| 4,411,297 | 10/1983 | Veillon | 144/219 |
| 4,509,572 | 4/1985 | L'Archer | 144/84 |

Primary Examiner—W. Donald Bray
Attorney, Agent, or Firm—Kokjer, Kircher, Bradley, Wharton, Bowman & Johnson

[57] ABSTRACT

A table for mounting a router in order to facilitate accuracy in a variety of routing operations. The table is supported on vertical screws extending from a mounting base. A manually operated chain and sprocket system threads the screws up and down in unison to raise and lower the table. The router is carried on a mounting plate which is hinged to the base frame so that its tilt angle is adjustable relative to the horizontal table surface. The ability of the router mounting plate to tilt allows the accurate cutting of dovetails and other joints in corners which are mitered at various angles.

18 Claims, 3 Drawing Sheets

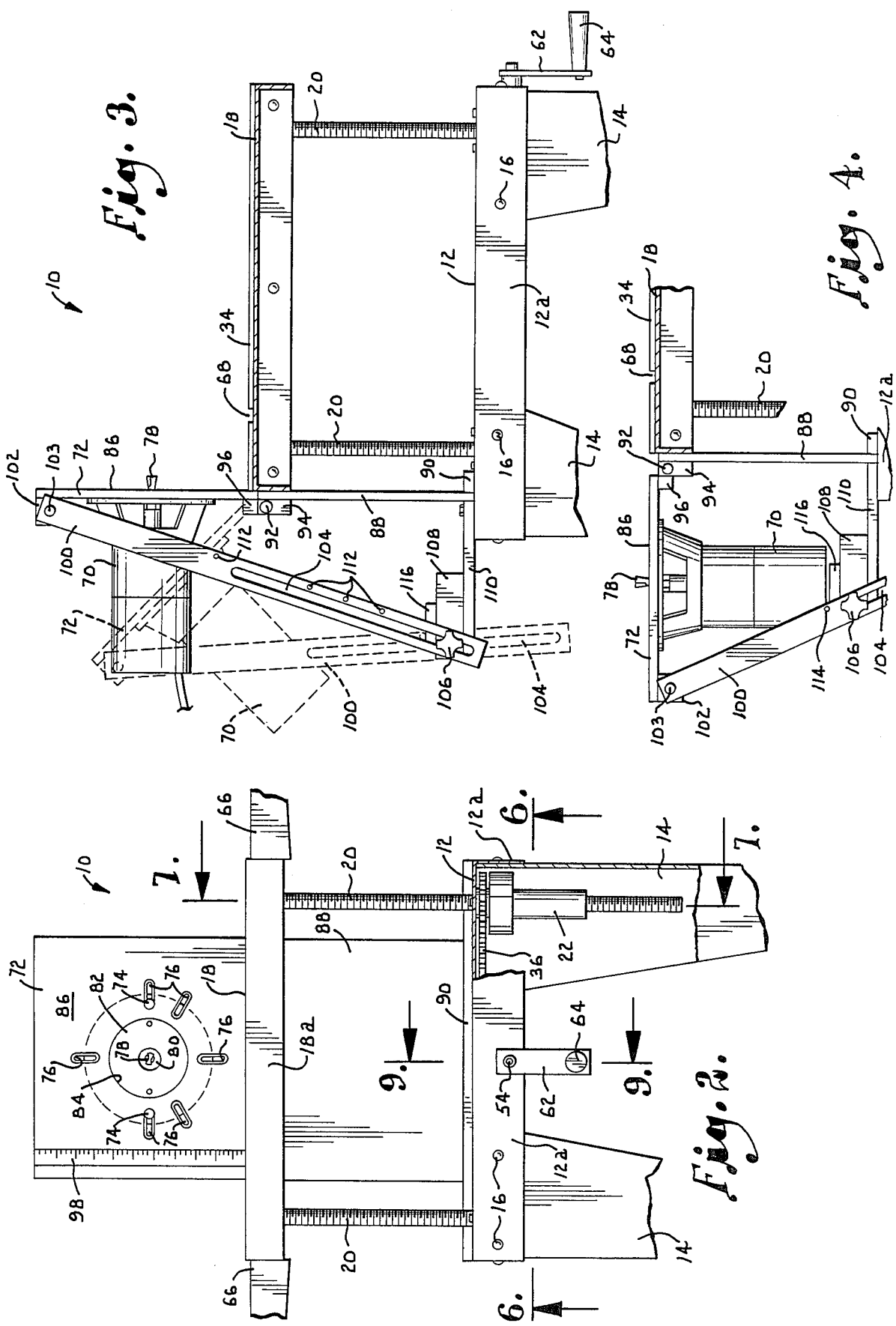

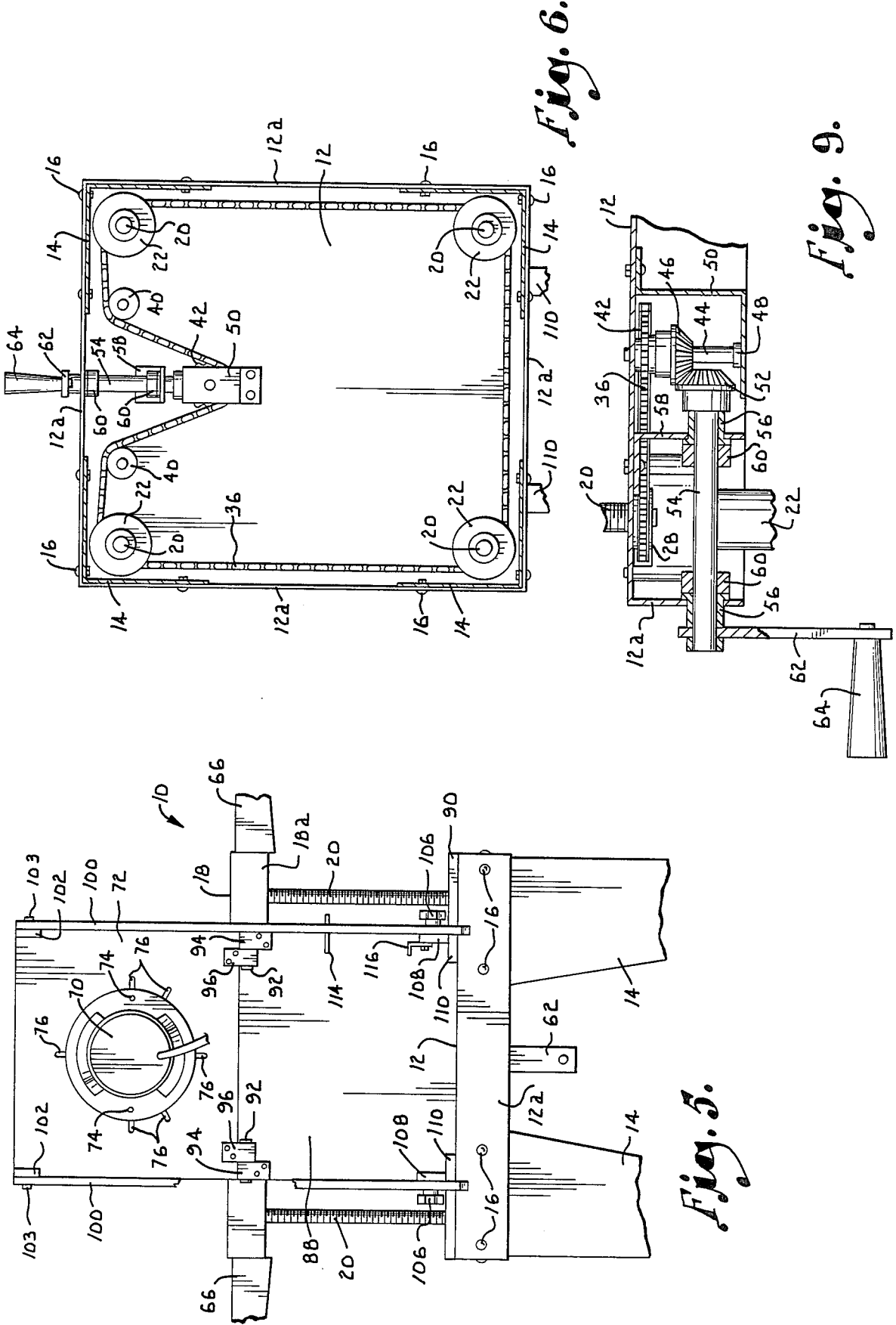

ROUTER MOUNTING TABLE

BACKGROUND AND SUMMARY OF THE INVENTION

This invention relates generally to woodworking and more particularly to a router table for use in cutting dovetail joints and in other precision woodworking operations.

Dovetail joints, finger joints and other common woodworking joints are often made with an electrically driven router. Because the cuts that form the fingers and slots of the joints must be precisely located in order to result in tightly fitting joints, router tables are often used because of their ability to make more precise cuts than can be made by hand. Most router tables mount the router below a table with the rotational axis of the router bit oriented vertically. U.S. Pat. No. 4,163,465 to Strong shows another type of router mount in which the router is held on a vertical support plate. A horizontal base plate is located below the support plate and is provided with a miter gauge groove. The router bit projects horizontally through the support plate and can be adjusted up or down by moving the support plate up or down through a screw crank mechanism.

Devices of the type shown in the aforementioned Strong patent are characterized by a number of drawbacks, including the relatively small size of the working surface. Perhaps even more importantly, routing operations on mitered corners can not be carried out without the use of a special fixture which rides in the miter slot on the base plate. Even when the special fixture is used, routing operations on mitered corners are at best difficult to carry out in an accurate manner. Additionally, the need for a special fixture for mitered joints complicates the equipment and increases the cost appreciably.

The present invention provides an improved router table which permits a wide variety of routing operations to be accurately carried out, including the cutting of dovetails and other types of joints in mitered corners. In accordance with the invention, the router is carried on a hinged mounting plate which can be tilted to the proper angle corresponding with the angle of the mitered joint.

Another important feature of the invention is the provision of a table which can be moved up and down and which can be easily and accurately adjusted as to its vertical position. Four vertical screws are used to mount the table on its supporting framework, and the connection of the screws with the four corners of the table provides a strong structural arrangement while at the same time allowing the table to be precisely adjusted up and down in order to properly locate the table surface relative to the router bit.

A further object of the invention is to provide a router table having an adjustment system for the table that maintains the working surface of the table horizontal at all times. The chain and sprocket mechanism which drives the screws up and down is operated by a hand crank and is arranged to assure that all sprockets are turned in unison in the same direction, thus assuring that all screws are extended and retracted the same distance.

Yet another object of the invention is to provide a router table of the character described in which the router mounting plate can be rigidly and securely locked at any desired tilt angle between vertical and horizontal.

An additional object of the invention is to provide, in a router table of the character described, an arrangement for accurately and repeatably locating the router mounting plate in commonly used tilt angles such as 45°.

A still further object of the invention is to provide a router table of the character described which is constructed in a simple and economical manner and which accommodates routers that vary in size and style.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 2 is a fragmentary front elevational view of the router table, with the router mounting plate in its vertical position and portions broken away for purposes of illustration;

FIG. 3 is a fragmentary side elevational view of the router table, with the solid lines showing the vertical position of the router mounting plate and the broken lines showing the router mounting plate at a 45° tilt angle;

FIG. 4 is a fragmentary side elevational view similar to FIG. 3, but showing the router mounting plate lowered to its horizontal position;

FIG. 5 is a fragmentary rear elevational view of the router table, with the mounting plate in its vertical position;

FIG. 6 is a fragmentary sectional view taken generally along line 6—6 of FIG. 2 in the direction of the arrows;

FIG. 9 is a fragmentary sectional view on an enlarged scale taken generally along line 9—9 of FIG. 2 in the direction of the arrows.

DETAILED DESCRIPTION OF THE INVENTION

Figure 1:
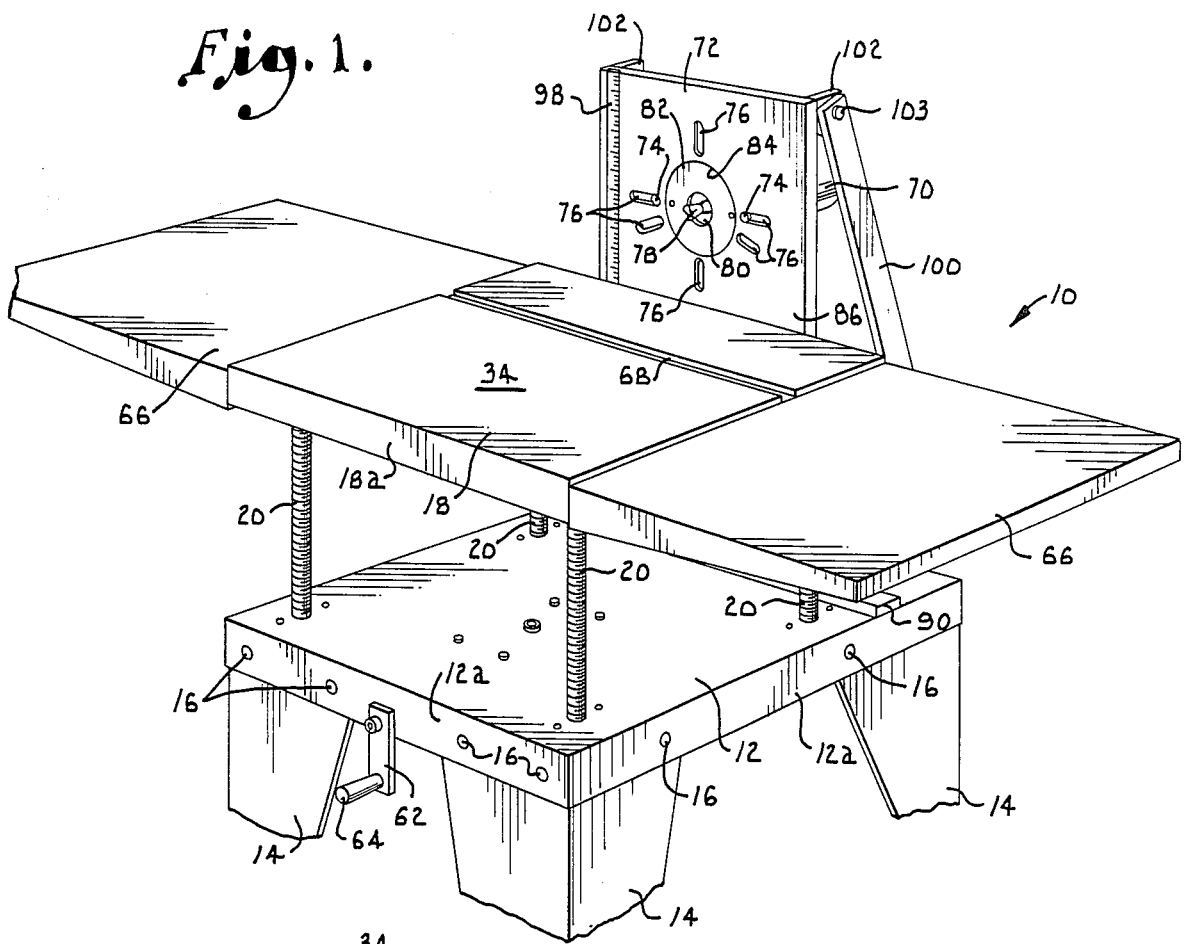
FIG. 1 is a perspective view of a router mounting table constructed according to a preferred embodiment of the present invention, with the router mounting plate in its vertical position.

Referring now to the drawings in more detail, numeral 10 generally designates a router table constructed in accordance with a preferred embodiment of the present invention. The router table 10 has a rigid frame which includes a flanged, rectangular plate 12 supported on four legs 14 which rest on the floor or another supporting surface. Each leg 14 is L shaped in cross section, and the four legs are secured to the four corners of plate 12 by bolts 16 or other fasteners which extend through the flanges 12a of plate 12 and also through the legs 14.

Plate 12 is horizontal and supports a horizontal table 18 which is mounted on top of four vertical screws 20.

Figure 7:
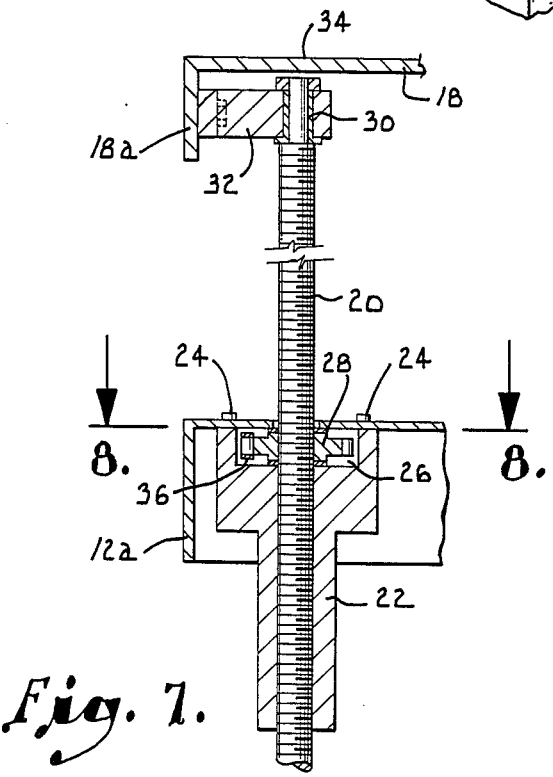
FIG. 7 is a fragmentary sectional view on an enlarged scale taken generally along line 7—7 of FIG. 2 in the direction of the arrows, with the break lines indicating continuous length.
Figure 8:
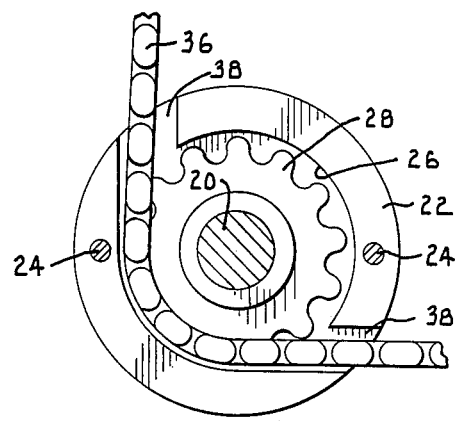
FIG. 8 is a fragmentary sectional view on an enlarged scale taken generally along line 8—8 of FIG. 7 in the direction of the arrows.

The screws 20 extend through guide sleeves 22 which are secured to the underside of plate 12 near its four corners. Screws 24 or other fasteners may be used to mount sleeves 22 to the bottom of plate 12. As best shown in FIGS. 7 and 8, each sleeve 22 has on its upper end an enlarged drum portion which presents a cavity 26 immediately below plate 12. A sprocket 28 is mounted for rotation within each of the cavities 26. Each sprocket 28 is internally threaded and is in threaded engagement with the corresponding screw 20.

With continued reference to FIG. 7, the top end of each screw 20 is reduced in diameter and is closely fitted in a bushing 30. The bushings 30 are mounted within openings formed in ears 32 which are in turn mounted on the inside surfaces of flanges 18a that extend downwardly from the edges of the table 18. Screws 20 may be pinned or otherwise prevented from rotating relative to the ears 32. Consequently, rotation of sprockets 28 in opposite directions causes the screws 20 to be threaded upwardly and downwardly, thus moving table 18 upwardly and downwardly. Table 18 has a flat upper surface 34 which forms a working surface for receiving workpieces that are to be routed. It is noted that each screw 20 projects the same distance above plate 12 so that the working surface 34 of the table is oriented horizontally at all times.

The sprockets 28 are all turned in unison in the same direction by an endless flexible drive chain 36 which is drawn around all of the sprockets 28. As best shown in FIG. 8, the drum portion of each sleeve 22 has a pair of perpendicular passages 38 through which chain 36 extends within cavity 26, chain 36 is drawn around sprocket 28 such that the sprockets are all rotated when the chain is moved in opposite directions. With additional reference to FIG. 6, chain 36 is drawn around a pair of adjustable idler sprockets 40 which maintain the proper tension in the chain. Chain 36 is also drawn around a drive sprocket 42 which serves to drive chain 36 in opposite directions in order to raise and lower table 18.

With additional reference to FIG. 9, the drive sprocket 42 is mounted on a short vertical shaft 44 which also carries a bevel gear 46. The lower end of shaft 44 is supported for rotation by a bearing 48 mounted on a Z shaped bracket 50 which is bolted to the underside of plate 12. Gear 46 is driven by a mating bevel gear 52 carried on the end of a horizontal shaft 54. Shaft 54 is received in a pair of bushings 56 with which are fitted in one of the flanges 12a and in an L shaped bracket 58 bolted to the underside of plate 12. Bearings 60 are mounted on bushings 56 to facilitate rotation of shaft 54.

A hand crank located on the front of the router table includes a crank arm 62 and a handle 64 secured to one end of the crank arm. The opposite end of the crank arm is secured to shaft 54 so that turning of the crank arm rotates shaft 54 and drives sprocket 42 through the bevel gears 52 and 46. Rotation of sprocket 42 in turn drives chain 36 and this results in simultaneous turning of all four sprockets 28 in the same direction in unison. Screws 20 are thus all moved the same distance up or down, depending upon the direction the hand crank is turned.

As best shown in FIG. 1, table 18 is provided with a pair of removable wing extensions 66 which are bolted to the opposite side flanges 18a of the table. The flat top surfaces of extensions 66 are located at the same level as the base of a miter gauge groove 68 which is formed in the working surface 34 and which extends the entire width of table 18 parallel to its front and back edges.

A conventional electric motor driven router 70 is secured to the back side of a rectangular mounting plate 72. A pair of bolts 74 are threaded into the router base through slots 76 formed through plate 72. Slots 76 are elongated in order to permit the mounting of routers that vary in their size and style, and the bolt heads are recessed in the slots to avoid projecting beyond the plate surface. Router 70 drives a rotating bit 78 which projects through a small circular opening 80 formed through a circular plate 82. Plate 82 is secured in place closely within a circular opening 84 formed in the center of plate 72. Different plates 82 having openings 80 that vary in size are provided so that router bits which differ in diameter can be accommodated. Plate 72 has a flat guide surface 86, and the rotational axis of the router bit 78 is perpendicular to surface 86 when the router is mounted on the plate. Bit 78 projects beyond the guide surface 86, and its distance of projection can be adjusted by adjusting the router in the usual manner. It is to be understood that different types of router bits can be installed on the router in the customary manner.

The router mounting plate 72 is hinged to the top of a vertical plate 88. As best shown in FIG. 3, plate 88 is located adjacent to the rear flange 18a of table 18. The lower edge of plate 88 is bolted or otherwise secured to a flat bar 90 which is in turn bolted to the top surface of table 12.

A pair of axially aligned hinge pins 92 provide a horizontal hinge axis about which plate 72 can be pivoted between the vertical position shown in solid lines in FIG. 3 and the horizontal position shown in FIG. 4. Each hinge pin 92 extends through a block 94 which is bolted to the back side of plate 88. Blocks 94 are located adjacent to the opposite side edges of plate 88 near its upper edge. Pins 92 are also extended through additional blocks 96 which are bolted to the lower edge portion of plate 72. In the vertical position of plate 72, the guide surface 86 occupies a vertical plane and is adjacent to the back edge of table 18. In the horizontal position of plate 72 (FIG. 4), the guide surface 86 has a horizontal orientation and faces upwardly.

The guide surface 86 of plate 72 is provided with a scale 98 having its "0" graduation mark aligned with the center of the bit opening 80. Consequently, the distance indicated by the graduation mark which aligns with the work surface 34 of table 18 represents the distance between the work surface and the center of the router bit 78.

A pair of rigid arms 100 provide adjustable braces for holding plate 72 at various tilt angles. Arms 100 are pivoted at their top ends to ears 102 which project from the back side of plate 72 near its opposite edges. Aligned horizontal pins 103 provide the pivot connections between arms 100 and ears 102. The lower portion of each arm 100 is provided with an elongated slot 104 which extends lengthwise along the arm. The slots 104 closely receive the shafts of hand screws 106 which are threaded into blocks 108. The blocks 108 are mounted on flat bars 110 which are secured at their forward ends to plate 12 at a location adjacent the lower edge of plate 88. When the hand screws 106 are loosened, their shafts can slide along slots 104, and plate 72 is then able to tilt to any position between its vertical and horizontal positions. When plate 72 has been adjusted to the proper tilt angle, the hand screws 106 can be tightened against arms 100, and they then serve to rigidly lock plate 72 in position.

One or both of the arms 100 may be provided with a plurality of small openings 112 which are spaced apart along one side of slot 104. A locator pin 114 may be closely fitted in any of the openings 112 which is selected, and the pin 114 then projects inwardly from arm 104, as best shown in FIG. 5. Plate 72 is then prevented from tilting backwardly beyond the position at which the pin 114 rests on top of an L shaped bracket 116 secured to block 108. The locations of the openings 112 are selected to correspond to commonly used tilt angles (such as 30°, 45° and 60°, for example). Thus, when the pin 114 is fitted in the opening which corresponds to a 45° tilt angle, plate 72 is oriented at 45° from vertical when the pin engages bracket 116. This permits the guide surface 86 to be accurately and repeatably located at selected commonly used tilt angles.

In operation of the routing table, table 18 is adjusted to the proper height for the routing operation that is to be performed. Plate 72 is likewise adjusted to the proper tilt angle. For example, if a dovetail groove is to be formed in a square corner, plate 72 is adjusted and locked in its vertical position by tightening hand screws 106, and crank 64 is turned until plate 18 is located the proper distance below the router bit 78. The workpiece is then fed with a miter gauge (not shown) along the work surface 34 with the edge that is to be cut moving along the guide surface 86 and through the rotating router bit 78.

If a groove is to be cut in a mitered corner, plate 72 is adjusted to the angle of the miter (usually 45°). With table 18 at the proper elevation, the workpiece is fed with the miter gauge along the work surface 34 and with the mitered edge that is to be cut held against the guide surface 86 as the groove is cut by bit 78.

It should be noted that finger joints and other woodworking joints can be formed by installing suitable bits in the router. It should also be noted that various other types of routing operations can be carried out on the router table 10. Plate 72 can be locked at any tilt angle, and it is thus possible to carry out routing operations on corners that are mitered at any angle.

When plate 72 is in the horizontal position shown in FIG. 4, guide surface 86 in effect forms a continuation of the working surface 34, and routing operations such as rounding over or making cove cuts on long edges and the like can be carried out in this position of the router mounting plate.

The elongated guide sleeves 22 receive a substantial portion of the length of each of the screws 20. The guide sleeves thus prevent wobbling and other misalignment of table 18 and provide a stable mounting arrangement for the adjustable table. At the same time, the screws are wholly located below table 18 and do not obstruct the work surface of the table. When the hand screws 106 are tightened against arms 100, the arms form rigid braces which function effectively to lock the router mounting plate 72 securely in place at the desired tilt angle.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A mounting arrangement for a router having a power driven router bit, said mounting arrangement comprising:
   a frame;
   a table presenting a substantially flat work surface;
   a plurality of generally vertical screws each having a top end coupled with said table at a location below said work surface;
   a drive member for each screw, said drive members being mounted on the frame for rotation and having threaded connections with the respective screws to effect up and down movement of the table when the drive members are rotated in opposite directions;
   means for rotating said drive members in unison to effect vertical adjustment of the table;
   a router mounting plate having a substantially flat guide surface;
   means for mounting said plate on said frame at a location adjacent said table wherein said work surface and guide surface cooperate to permit sliding of a workpiece along said work surface and guide surface; and
   means for rigidly mounting the router on said mounting plate with the router bit projecting from said guide surface.

2. The invention of claim 1, including:
   a flexible drive element in driving engagement with all of said drive members to rotate the drive members in unison in opposite directions when said drive element is driven in opposite directions; and
   means for driving said drive element in opposite directions.

3. The invention of claim 2, wherein said driving means comprises a hand crank and means for coupling said hand crank with said drive element in a manner to move the drive element in opposite directions when the hand crank is turned in opposite directions.

4. A mounting arrangement for a router having a power driven router bit, said mounting arrangement comprising:
   a frame;
   a table presenting a substantially flat work surface;
   means for mounting said table on the frame in a manner permitting selective vertical movement of the table, said mounting means being arranged to maintain said work surface in a substantially horizontal orientation as the table is adjusted vertically;
   a router mounting plate having a substantially flat guide surface;
   hinge means coupling said plate with said frame and establishing a generally horizontal hinge axis about which said mounting plate is pivotal between a vertical position wherein said guide surface is substantially perpendicular to said work surface and a horizontal position wherein said guide surface has a substantially horizontal orientation whereby said surfaces cooperate to accommodate sliding of a work piece along the surfaces; and means for rigidly mounting the router on said mounting plate with the router bit projecting from said guide surface.

5. The invention of claim 4, wherein said releaseable means comprises:
a rigid arm having one end pivotally coupled to said router mounting plate at a location offset from said hinge axis;
means for coupling said arm with the frame for sliding movement thereon; and
releaseable lock means for locking said arm to the frame.

6. The invention of claim 5, including:
a bracket on said frame;
a plurality of openings spaced apart at selected locations along the length of said arm; and
a locator pin fitting removably in each of said openings, said pin projecting from each opening in which it is fitted to engage said bracket in a manner to locate said table at a preselected angular position between said vertical and horizontal positions.

7. A mounting arrangement for a router having a router bit driven about a rotational axis, said mounting arrangement comprising:
a frame;
a table presenting a substantially flat work surface;
means for mounting said table on said frame in a manner to maintain said work surface in a substantially horizontal orientation;
a router mounting plate having a substantially flat guide surface;
hinge means for mounting said plate on said frame at a location adjacent said table and in a manner permitting said plate to pivot about a substantially horizontal hinge axis between a vertical position wherein said guide surface is generally perpendicular to said work surface and a horizontal position wherein said guide surface is substantially parallel to said work surface; and
means for rigidly mounting the router on said mounting plate with the router bit projecting from said guide surface and the rotational axis oriented substantially perpendicular to the guide surface.

8. The invention of claim 7, including:
a rigid arm having one end pivotally coupled to the router mounting plate at a location offset from said hinge axis;
means for coupling said arm with the frame for sliding movement thereon; and
releaseable lock means for locking said arm to the frame.

9. The invention of claim 8, including:
a bracket on said frame;
a plurality of openings spaced apart at selected locations along the length of said arm; and
a locator pin fitting removably in each of said openings, said pin projecting from each opening in which it is fitted to engage said bracket in a manner to locate said table at a preselected angular position between said vertical and horizontal positions.

10. The invention of claim 7, including a miter gauge groove in said work surface, said groove extending substantially parallel to said hinge axis.

11. The invention of claim 7, wherein said mounting means for the table comprises:
a plurality of generally vertical screws each having a top end coupled with said table at a location below said work surface; and
a drive member for each screw, said drive members being mounted on the frame for rotation and having threaded connections with the respective screws to effect up and down movement of the table when the drive members are rotated in opposite directions.

12. The invention of claim 11, including means for rotating said drive members in unison to effect vertical adjustment of the table.

13. The invention of claim 11, including:
a flexible drive element in driving engagement with all of said drive members to rotate the drive members in unison in opposite directions when said drive element is driven in opposite directions; and
means for driving said drive element in opposite directions.

14. The invention of claim 13, wherein said driving means comprises a hand crank and means for coupling said hand crank with said drive element in a manner to move the drive element in opposite directions when the hand crank is turned in opposite directions.

15. A mounting arrangement for a router having a power driven router bit, said mounting arrangement comprising:
a frame;
a table presenting a substantially flat work surface;
a plurality of drive members supported for rotation on the frame;
a plurality of generally vertical screws for mounting the table on the frame for adjustable up and down movement, each screw being coupled with said table and each screw having a threaded connection with a corresponding one of the drive members to move the table up and down upon rotation of said drive members in opposite directions;
means for effecting rotation of all of said drive members in unison to adjust the table vertically while maintaining said work surface in a generally horizontal orientation at all positions of the table;
a router mounting plate having a substantially flat guide surface and a bit opening for receiving the router bit;
hinge means for mounting said plate on said frame for pivotal movement about a generally horizontal hinge axis between a vertical position wherein said guide surface occupies a substantially vertical plane adjacent one edge of the table and a horizontal position wherein said guide surface occupies a substantially horizontal plane;
releaseable means for rigidly maintaining said router mounting plate in selected positions between said vertical and horizontal positions to permit a workpiece to slide along the work and guide surfaces; and
means for mounting the router on said mounting plate with the router bit projecting through said bit opening and beyond said guide surface.

16. The invention of claim 15, including a groove in said work surface for receiving a miter gauge, said groove extending substantially parallel to said hinge axis.

17. The invention of claim 15, wherein:
said drive members comprise rotatable sprockets; and
said rotation effecting means comprises a drive chain drawn around all of said sprockets and means for moving said chain in opposite directions.

18. The invention of claim 17, wherein said chain moving means comprises:

a drive sprocket mounted for rotation on the frame and engaging said chain in a manner to move same in opposite directions when the drive sprocket is rotated in opposite directions;

a crank handle on the frame; and a drive linkage between the handle and drive sprocket for effecting rotation of the latter in opposite directions when the handle is turned in opposite directions.

* * * * *